United States Patent [19]

Olsen

[11] Patent Number: 5,384,213
[45] Date of Patent: Jan. 24, 1995

[54] METHOD FOR MAKING SOLID ELECTROLYTES EMPLOYING LOW BOILING POINT SOLVENTS

[75] Inventor: Ib I. Olsen, San Jose, Calif.

[73] Assignee: Valence Technology, Inc., San Jose, Calif.

[21] Appl. No.: 73,833

[22] Filed: Jun. 8, 1993

[51] Int. Cl.$^6$ .............................................. H01M 6/18
[52] U.S. Cl. ...................................... 429/192; 429/191
[58] Field of Search ................. 429/192, 191; 252/62.2

[56] References Cited

U.S. PATENT DOCUMENTS 4,654,279  3/1987  Bauer et al. .......................... 252/62.2
5,001,023  3/1991  Cheshire et al. ................. 429/192 X

*Primary Examiner*—John S. Maples
*Attorney, Agent, or Firm*—Russell LaPaglia

[57] ABSTRACT

Disclosed is a process for making a solid electrolyte for use in solid state electrochemical device which process includes the use of a solvent comprising a low boiling point component having a boiling point not greater than about 100° C. Specifically, the disclosed process comprises:

(i) solvating a solid matrix-forming monomer or a partial polymer thereof in a solvent comprising at least one low boiling point solvent component having a boiling point not greater than 100° C. and which is capable of solvating an electrolytic salt;

(ii) coating the solvated monomer or partial polymer onto an electrode to form a layer of electrolyte precursor;

(iii) covering said electrolyte precursor with a protective sheet layer which is substantially impervious to said solvent but which allows passage of radiation which cures the uncured electrolyte; and (iv) curing the electrolyte precursor by radiation through the sheet layer.

18 Claims, 1 Drawing Sheet

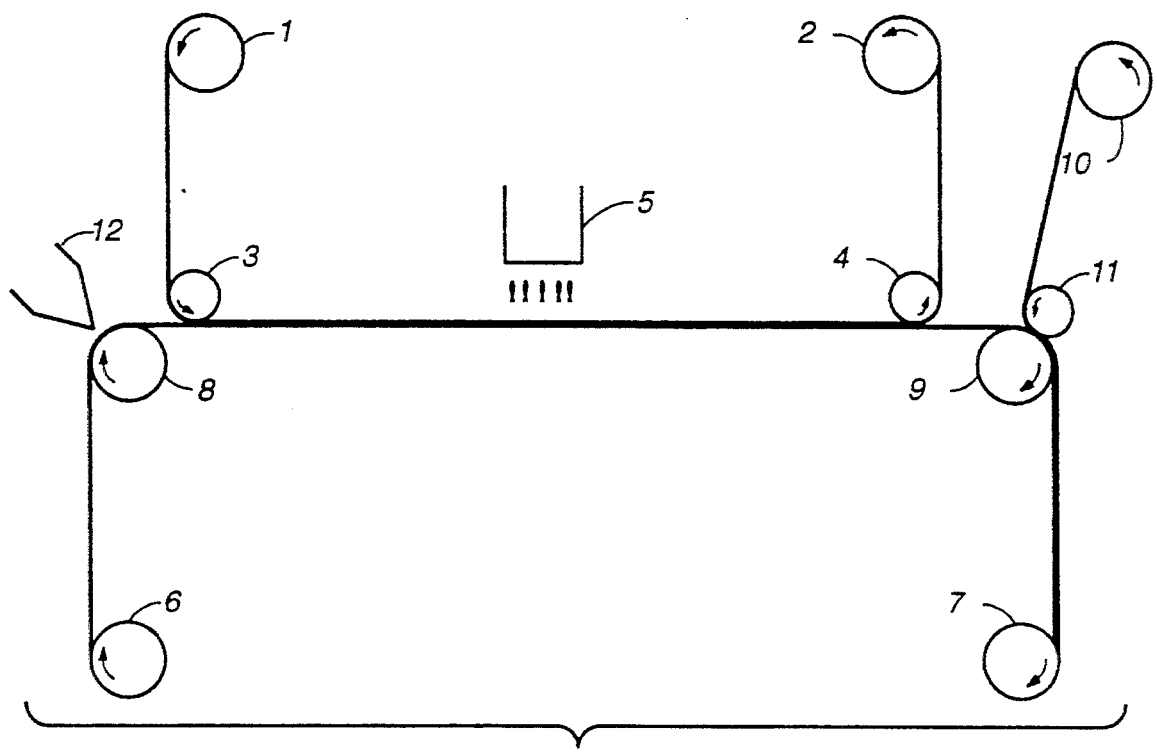
FIG._1
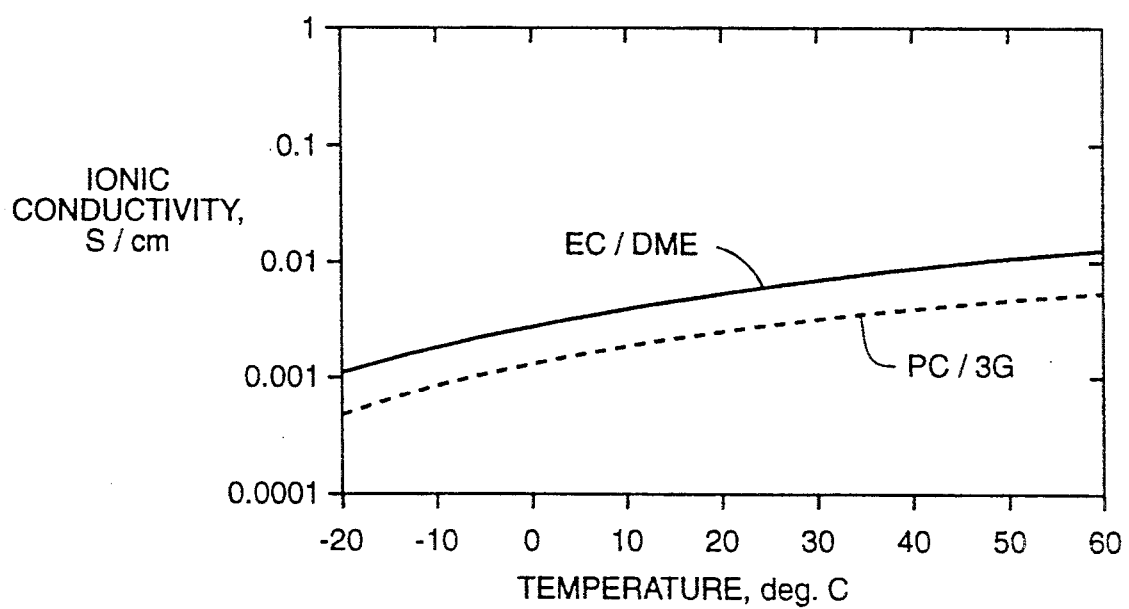
FIG._2

METHOD FOR MAKING SOLID ELECTROLYTES EMPLOYING LOW BOILING POINT SOLVENTS

BACKGROUND OF THE INVENTION

1. Field of the Invention

The present invention relates to solid state electrochemical devices and, more particularly, to solid state electrochemical devices in which the electrolyte is a polymeric network, such as one interpenetrated by an ionically conducting liquid phase.

2. State of the Art

Traditional batteries, employing aqueous solutions as the electrolytes, have given way to electrochemical devices, such as batteries and capacitors, which have a solid electrolyte. Unlike their aqueous electrolyte counterparts, the solid electrolyte devices offer the advantages of thermal stability, absence of corrosion of the electrodes, and the ability to be manufactured in thin layers.

Electrolytic cells containing an anode, a cathode and a solid, solvent-containing electrolyte are known in the art. These cells offer a number of advantages over electrolytic cells containing a liquid electrolyte, i.e., liquid batteries, including improved safety features.

The solid electrolyte is interposed between the cathode and the anode. To date, the solid electrolytes have been constructed from either inorganic or organic matrices including a suitable inorganic ion salt. The inorganic matrix may be non-polymeric [e.g., $\beta$-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, and an acryloyl-derivatized polyalkylene oxide containing an acryloyl group of the formula $CH_2=CR'C(O)O-$ where $R'$ is hydrogen or lower alkyl of from 1-6 carbon atoms.

Because of their expense and difficulty in forming into a variety of shapes, inorganic non-polymeric matrices are generally not preferred and the art typically employs a solid electrolyte containing a polymeric matrix.

Preferably, the solid polymeric matrix is an organic matrix derived from a solid matrix-forming monomer and/or from partial polymers of a solid matrix-forming monomer.

One problem which research efforts have attempted to overcome in the design of solid state electrochemical cells from a solid matrix is the poor conductivity of polymeric electrolytes at room temperature and below. In many cases, the cells which have been designed to date are used at elevated temperatures due to the low conductivity of the electrolyte at ambient temperatures.

In addition to providing a high ionic conductivity, it is important that a solid electrolyte also provide good mechanical strength. Unfortunately, there is a tendency for these two properties to oppose one another. Attempts to increase conductivity usually involve a reduction in molecular weight and result in fluid or mechanically weak films. Techniques, such as crosslinking, increase film strength but generally result in a loss in conductivity.

The problem of striking a suitable balance between these two mutually exclusive properties has been solved to some extent by providing a solid electrolyte which is a two phase interpenetrated network of a mechanically supporting phase of a continuous network of a crosslinked polymer and an ionic conducting phase comprising a metal salt and a complexing liquid polymer such as liquid polyethylene oxide complexed with a lithium salt, as set forth in U.S. Pat. No. 4,654,279. As explained therein, the mechanically supporting phase forms a matrix which supports an interpenetrating ionically conducting liquid polymer phase which provides continuous paths of high conductivity throughout the matrix. Representative examples of the mechanically supporting phase described in U.S. Pat. No. 4,654,279 are epoxies, polyurethanes, polyacrylates, polymethacrylates, polystyrenes and polyacrylonitriles.

The solvent (plasticizer) is typically added to the matrix in order to enhance the solubility of the inorganic ion salt in the solid electrolyte and thereby increase the conductivity of the electrolytic cell. In this regard, the solvent requirements of the solvent used in the solid electrolyte are recognized by those skilled in the art to be different from the solvent requirements in liquid electrolytes. For example, solid electrolytes require a lower solvent volatility as compared to the solvent volatilities permitted in liquid electrolytes.

These electrolyte solvents are solvents capable of complexing the electrolytes so as to render the salt mixture ionically conductive. In this regard, the electrolyte solvent can be a single solvent or a mixture of two or more solvents selected to enhance the complexing and thus improve the electrochemical properties of the resulting cell.

Suitable electrolyte solvents known in the art for use in such solid electrolytes include, by way of example, propylene carbonate, ethylene carbonate, $\gamma$-butyrolactone, tetrahydrofuran, glyme (dimethoxyethane), diglyme, tetraglyme, dimethylsulfoxide, dioxolane, sulfolane and the like. Other suitable solvents, as disclosed in U.S. Pat. No. 5,289,143 and Ser. No. 07/918,508 (Attorney Docket No. 028574-046) of common assignee which are herein incorporated by reference in their entirety, include mixtures of organic carbonates, e.g., propylene carbonate, and triglyme.

When the solid electrolyte is formed on a cathodic surface, an anodic material can then be laminated onto the solid electrolyte to form a solid battery (i.e., an electrolytic cell).

The development of the solid electrolyte including the two phase interpenetrated network of a mechanically supporting phase of a continuous network of a crosslinked polymer and an ionic conducting phase comprising a metal salt of a complexing liquid polymer overcame to a significant extent the problem of striking a balance between good mechanical strength on the one hand and good conductivity on the other hand.

One particularly preferred solid electrolyte battery, including a crosslinked polymeric phase and an ionic conducting phase, employs lithium as the anode. In particular, lithium has been of interest due to its low density and highly electropositive nature.

A typical cell will incorporate, for example, a lithium or lithium based anode and a cathode containing a vanadium oxide compounds, e.g., $V_6O_{13}$, as the active material. The lithium anode may be a metal foil. The electrolyte layer comprises a polymeric matrix, lithium salt, and an electrolyte solvent comprising propylene carbonate. The cathode structure consists of a composite material containing the active cathode material, e.g., $V_6O_{13}$, a polymeric electrolyte material, and carbon, e.g., in the form of acetylene black. These batteries have been found to be beneficial in terms of ease of construction, ruggedness, interfacial properties, open circuit voltage, energy density, and rechargeability.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent are then added to the solution. This solution is then placed on the surface of a suitable substrate (e.g., the surface of a cathode) and the volatile solvent is removed to provide for the solid electrolyte.

In the other method, a monomer or partial polymer of the solid matrix to be formed is combined with appropriate amounts of the inorganic ion salt and the electrolytic solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

With respect to the first of the above two techniques for forming the solid electrolyte, there are obviously required two separate solvents, the first of which is a volatile one which evaporates before or during the crosslinking step and the second of which remains in the solid electrolyte after crosslinking to provide the solvent phase for the ionic salt. The second technique employs only one solvent which serves both as the agent for solvating the prepolymer before and during crosslinking and as the solvent for the ionic conducting phase after crosslinking has been completed.

Quite clearly, the second technique for forming a solid technique has the advantage, as compared to the first technique, of only requiring a single solvent for the dual function of solvating the prepolymer before crosslinking and solvating the ionic conducting phase after crosslinking. To achieve both of these functions simultaneously, the art has had to resort to the use of a solvent having a relatively high boiling point, i.e., above 100° C., in order that enough solvent remain after the crosslinking to solvate the ionically conductive phase in the crosslinked polymeric electrolyte. In particular, as the solvated electrolyte precursors are exposed to the open air both when applied to an underlying substrate and when crosslinked as by electron beam radiation, it was found that only a solvent of relatively high boiling point would remain in sufficient quantities after crosslinking so as to solvate the ionically conducting phase.

The use of such high boiling point solvents has prevented undesirable evaporation of solvent from the monomer/partial polymer prior to crosslinking. Nonetheless, they have been found to give rise at the same time to a distinct disadvantage in that such high boiling solvents affect the performance of the electrolytic device, especially low temperatures, e.g., below ambient. In particular, it has been found that the higher boiling solvents, as opposed to their more volatile lower boiling counterparts, become quite viscous and thus interfere with the distribution of the ionically conductive phase in the solid electrolyte.

Thus, the only manner in which the art to date has been able to manufacture solid state electrochemical devices employing a dual use solvent (where the solvent serves both as the vehicle for dissolving the electrolyte precursor components and as the solvent for the ionically conductive phase) has been to solely employ high boiling point solvents which compromise the low temperature performance of the electrochemical device.

SUMMARY OF THE INVENTION

In view of above-described shortcomings associated with the use of high boiling point dual use solvents in the manufacture of solid state electrochemical devices in accordance with prior art, as well as other disadvantages not specifically mentioned above, it should be apparent that there still exists a need in the art for a process for manufacturing a solid state electrochemical device employing a dual use solvent (both solvating solid electrolyte precursors during the manufacturing process and solvating the ionically conductive phase after the manufacturing) which does not adversely affect the low temperature performance of the device. The present invention can achieve this heretofore elusive combination of properties by providing a process for manufacturing a solid state electrochemical device wherein it is now possible to employ a lower boiling point dual use solvent.

In particular, the present invention provides a process for making solid electrolyte comprising:
  (i) solvating a solid electrolyte precursor comprising a solid matrix forming monomer and/or partial polymer thereof in a solvent comprising at least one component having a boiling point lower than 100° C. and which is capable of solvating an electrolytic salt;
  (ii) coating the solvated solid electrolyte precursor onto an electrode to form a layer of solid electrolyte precursor;
  (iii) covering the solid electrolyte precursor with a protective sheet layer which is substantially impervious to the solvent but which allows passage of radiation which cures the uncured solid electrolyte; and
  (iv) curing the solid electrolyte precursor by radiation through the sheet layer.

In another aspect, the process of the present invention further comprises:
  (v) removing the protective sheet layer from the cured solid electrolyte; and
  (vi) applying an electrode layer to the cured solid electrolyte.

With the foregoing as well as other advantages and features of the invention which will become hereinafter apparent, the nature of the invention can be better understood by reference to the Detailed Description of Preferred Embodiments as well as to the appended claims.

BRIEF DESCRIPTION OF THE DRAWINGS

FIG. 1 shows a schematic view of a preferred apparatus for carrying out the process of the invention;

FIG. 2 is a graph depicting of the conductivity as a function of temperature of a solid electrolyte in accordance with the invention versus a solid electrolyte of the art.

DETAILED DESCRIPTION OF PREFERRED EMBODIMENTS

As discussed in the Background section of the present application, electrolytic cells including a solid electrolyte interspersed between a cathode and an anode are well known. The cells may further include a current collector which is typically found adjacent the anode or cathode, on the side thereof opposite to that facing the solid electrolyte. For the sake of completeness, a brief discussion of each of the components of such cells is now presented. However, such discussion should be viewed as merely illustrative.

As the anode component, the present invention employs an alkali metal anode such as lithium or sodium. Preferred anodes are lithium, lithium alloys such as alloys of lithium with aluminum, mercury, nickel, zinc, and the like. There may be employed a lithium foil or lithium coated foil such as nickel or copper foil having a layer of lithium deposited on its surface. Lithium is preferred because it is very electropositive and light in weight.

The cathode preferably includes an intercalation or insertion metal compound. These compounds are well known in the art and include transition metal oxides, sulfides, selenides, etc. Representative materials are vanadium oxides such as $V_2O_5$, $V_6O_{13}$ and $LiV_3O_8$ and the like, and sulfides of titanium and niobium such as $TiS_2$, as well as chromium oxide, copper oxide and the like. The cathode may also contain an electronically conductive material such as graphite, carbon black, powdered nickel, metal particles, conductive polymers, and the like. Other known cathodic materials may also be employed.

Typically, the cathode is prepared from a cathode paste which comprises from about 35 to about 65 weight percent of a compatible cathodic material; from about 1 to 20 weight percent of an electroconductive material; up to about 20 weight percent of polyethylene oxide having a number average molecular weight of at least 100,000; from about 10 to 50 weight percent of a suitable solvent; and from at least about 5 weight percent to about 30 weight percent of a solid matrix forming monomer or partial polymer thereof. (All weight percents are based on the total weight of the cathode).

The cathode paste is spread onto a suitable support such as current collector and cured by conventional methods to provide for a solid positive cathodic plate. The cathode (excluding the support) generally has a thickness of about 20 to about 150 microns.

In one preferred embodiment, the cathode can be produced as follows:

The current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween.

Specifically, the adhesion promoter layer is prepared as a dispersed colloidal solution in one of two methods. The first preparation of this colloidal solution for this example is as follows:

- 84.4 parts of carbon powder (Shawinigan Black TM—available from Chevron Chemical Company, San Ramon, Calif.)
- 337.6 parts of a 25 weight percent solution of polyacrylic acid (a reported average molecular weight of about 90,000, commercially available from Aldrich Chemical Company—contains about 84.4 grams polyacrylic acid and 253.2 grams water)
- 578.0 parts of isopropanol The carbon powder and isopropanol are combined with mixing in a conventional high shear colloid mill mixer (Ebenbach-type colloid mill) until the carbon is uniformly dispersed and the carbon particle size is smaller than 10 microns. At this point, the 25 weight percent solution of polyacrylic acid is added to the solution and mixed for approximately 15 minutes. The resulting mixture is pumped to the coating head and roll coated with a Meyer rod onto a sheet of aluminum foil (about 9 inches wide and about 0.0005 inches thick). After application, the solution/foil are contacted with a Mylar wipe (about 0.002 inches thick by about 2 inches and by about 9 inches wide—the entire width of aluminum foil). The wipe is flexibly engaged with the foil (i.e., the wipe merely contacted the foil) to redistribute the solution so as to provide for a substantially uniform coating. Evaporation of the solvents (i.e., water and isopropanol) via a conventional gas-fired oven provides for an electrically-conducting adhesion-promoter layer of about 6 microns in thickness or about $3 \times 10^{-4}$ grams per $cm^2$. The aluminum foil is then cut to about 8 inches wide by removing approximately ½ inch from either side by the use of a conventional slitter so as to remove any uneven edges.

In order to further remove the protic solvent from this layer, the foil is redried. In particular, the foil is wound up and a copper support placed through the roll's cavity. The roll is then hung overnight from the support in a vacuum oven maintained at about 130° C. Afterwards, the roll is removed. In order to avoid absorption of moisture from the atmosphere, the roll is preferably stored into a desiccator or other similar anhydrous environment to minimize atmospheric moisture content until the cathode paste is ready for application onto this roll.

The second preparation of this colloidal solution comprises mixing 25 lbs of carbon powder (Shawinigan Black TM—available from Chevron Chemical Company, San Ramon, Calif.) with 100 lbs of a 25 weight percent solution of polyacrylic acid (average molecular weight of about 240,000, commercially available from BF Goodrich, Cleveland, Ohio, as Good-Rite K702—contains about 25 lbs polyacrylic acid and 75 lbs water) and with 18.5 lbs of isopropanol. Stirring is done in a 30 gallon polyethylene drum with a gear-motor mixer (e.g., Lightin Labmaster Mixer, model XJ-43, available from Cole-Parmer Instruments Co., Niles, Ill.) at 720 rpm with two 5 inch diameter A310-type propellers mounted on a single shaft. This wets down the carbon and eliminates any further dust problem. The resulting weight of the mixture is 143.5 lbs and contains some "lumps".

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu m$ with the occasional 12.5 $\mu m$ particles. The mixture can be stored for well over 1 month without the carbon settling out or reagglomerating.

When this composition is to be used to coat the current collector, an additional 55.5 lbs of isopropanol is mixed into the composition working with 5 gallon batches in a plastic pail using an air powered shaft mixer (Dayton model 42231 available from Granger Supply Co., San Jose, Calif.) with a 4 inch diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and Meyer-rod coated as described above.

In this embodiment, the cathode is prepared from a cathodic paste which, in turn, is prepared from a cathode powder as follows:

i. Cathode Powder

The "cathode powder" is prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black ™). About 100 grams of the resulting mixture is placed into a grinding machine (Attritor Model S-1 purchased from Union Process, Akron, Ohio) and ground for 30 minutes. Afterwards, the resulting mixture is dried at about 260° C. for 21 hours.

ii. Cathode Paste

A "cathode paste" is prepared by combining sufficient cathode powder to provide for a final product having 45 weight percent $V_6O_{13}$.

Specifically, 171.6 grams of a 4:1 weight ratio of propylene carbonate:triglyme is combined with 42.9 grams of polyethylene glycol diacrylate (molecular weight about 400 available as SR-344 from Sartomer Company, Inc., Exton, Pa.), and about 7.6 grams of ethoxylated trimethylolpropane triacylate (TMPEOTA) (molecular weight about 450 available as SR-454 from Sartomer Company, Inc., Exton, Pa.) in a double planetary mixer (Ross #2 mixer available from Charles Ross & Sons, Company, Hauppag, N.Y.).

A propeller mixer is inserted into the double planetary mixer and the resulting mixture is stirred at 150 rpms until homogeneous. The resulting solution is then passed through sodiated 4A molecular sieves. The solution is then returned to double planetary mixer equipped with the propeller mixer and about 5 grams of polyethylene oxide (number average molecular weight about 600,000 available as Polyox WSR-205 from Union Carbide Chemicals and Plastics, Danbury, Conn.) is added to the solution vortex from by the propeller by a mini-sieve such as a 25 mesh mini-sieve commercially available as Order No. 57333-965 from VWR Scientific, San Francisco, Calif.

The solution is then heated while stirring until the temperature of the solution reaches 65° C. At this point, stirring is continued until the solution is completely clear. The propeller blade is removed and the carbon powder prepared as above is then is added as well as an additional 28.71 grams of unground carbon (from Chevron Chemical Company, San Ramon, Calif. under the tradename of Shawinigan Black ™). The resulting mixture is mixed at a rate of 7.5 cycles per second for 30 minutes in the double planetary mixer. During this mixing the temperature is slowly increased to a maximum of 73° C. At this point, the mixing is reduced to 1 cycle per second the mixture slowly cooled to 40° C. to 48° C. (e.g. about 45° C.). The resulting cathode paste is maintained at this temperature until just prior to application onto the current collector.

The resulting cathode paste has the following approximate weight percent of components:

$V_6O_{13}$ 45 weight percent
Carbon 10 weight percent
4:1 propylene carbonate/triglyme 34 weight percent
polyethylene oxide 1 weight percent
polyethylene glycol diacrylate 8.5 weight percent
ethoxylated trimethylolpropane triacrylate 1.5 weight percent In an alternative embodiment, the requisite amounts of all of the solid components are added to directly to combined liquid components. In this regard, mixing speeds can be adjusted to account for the amount of the material mixed and size of vessel used to prepare the cathode paste. Such adjustments are well known to the skilled artisan.

In order to enhance the coatability of the carbon paste onto the current collector, it may be desirable to heat the paste to a temperature of from about 60° C. to about 130° C. and more preferably, from about 80° C. to about 90° C. and for a period of time of from about 0.1 to about 2 hours, more preferably, from about 0.1 to 1 hour and even more preferably from about 0.2 to 1 hour. A particularly preferred combination is to heat the paste at from about 80° C. to about 90° C. for about 0.33 to about 0.5 hours.

During this heating step, there is no need to stir or mix the paste although such stirring or mixing may be conducted during this step. However, the only requirement is that the composition be heated during this period. In this regard, the composition to be heated has a volume to surface area ratio such that the entire mass is heated during the heating step.

A further description of this heating step is set forth in U.S. patent application Ser. No. 07/968,203 filed Oct. 29, 1992 as Attorney Docket No. 1116 and entitled "METHODS FOR ENHANCING THE COATABILITY OF CARBON PASTES TO SUBSTRATES" which application is incorporated herein by reference in its entirety.

The so-prepared cathode paste is then placed onto the adhesion layer of the current collector described above by extrusion at a temperature of from about 45° to about 48° C. A Mylar cover sheet is then placed over the paste and the paste is spread to thickness of about 90 microns (μm) with a conventional plate and roller system and is cured by continuously passing the sheet through an electron beam apparatus (Electro-curtain, Energy Science Inc., Woburn, Mass.) at a voltage of about 175 Kv and a current of about 1.0 mA and at a rate of about 1 cm/sec. After curing, the Mylar sheet is removed to provide for a solid cathode laminated to the aluminum current collector described above.

As the solid electrolyte, there may be preferably employed any of the polymers well known in the art. For example, the polymers described in U.S. Pat. No. 4,303,748 to Armand or in U.S. Pat. No. 4,654,279 to the National Bureau of Standards may be employed. It is typically composed of a polymer such as polyethylene oxide and a suitable inorganic salt, the inorganic salt being one which renders the polymer ionically conductive.

In the preparation of the solid, solvent-containing electrolyte in accordance with the present invention, the polymeric electrolyte precursors, i.e., the solid matrix forming monomers and/or partial polymers thereof, are combined with the ionic salt and the solvent of the invention (which serves as both the solvent for the polymeric electrolyte precursors prior to crosslinking and as the solvent for the ionically conductive salts after crosslinking).

The term "a solid matrix forming monomer" refers to inorganic or organic materials which in monomer form can be polymerized, preferably in the presence of an alkali metal salt and a solvent to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. Pat. No. 5,262,253 which patent is incorporated herein by reference in its entirety), and the like as well as mixtures thereof.

Examples of suitable inorganic solid matrix forming monomers include, by way of example, phosphazines and siloxanes. Phosphazine monomers and the resulting phosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent, to form solid matrices which are suitable for use as solid electrolytes in electrolytic cells.

As discussed above, a solid matrix forming monomer or partial polymer thereof is combined with both a solvent and an ionic salt in accordance with techniques which are well known in the art.

The inorganic salt is one which renders the polymer ionically conductive and is selected from those salts conventionally used in solid state electrochemical cells. Representative examples are sodium, lithium, and ammonium salts of less mobile anions of weak bases having a large anionic radius. Examples of anions include $I^-$, $Br^-$, $SCN^-$, $ClO_4^-$, $BF_4^-$, $PF_6^-$, $AsF_6^-$, $CF_3SO_3^-$. Specific examples of inorganic salts which have been found operable in the invention include $LiAsF_6$, $LiBF_4$, $LiPF_6$, $NaClO_4$, $LiClO_4$, and $LiCF_3SO_3$.

The salt may be used up to an amount which does not exceed its solubility limit in the electrolyte. The amount will therefore vary with the nature of the radiation polymerizable material and the radiation inert liquid electrolyte solvent. As a general rule, the maximum amount of salt within its solubility limit should be used to maximize the ionic conductivity of the electrolyte. In most applications about 10 to 60 parts salt is used per 100 parts of electrolyte solvent.

As discussed above, when employing dual use solvents in the manufacture of solid electrolytes, the art to date has solely employed high boiling solvents such as propylene carbonate, mixtures of organic solvents, e.g., propylene carbonate and glyme. The use of a solvent having a high boiling point was considered necessary in order to ensure that the solvent did not evaporate from the electrolyte precursor when applied to an electrode and crosslinked.

Unfortunately, while solving the problem of solvent evaporation, such high boiling point solvents have created a new problem in that they adversely affect its performance, especially at reduced temperatures of below, for example, 10° C.

The present invention provides a process wherein it is possible to employ a lower boiling point solvent without risk of such solvent evaporating away prior to the curing of the electrolyte precursor.

This can be achieved by a process including the following steps:

(i) solvating a electrolyte precursor comprising a solid matrix forming monomer and/or partial polymer thereof capable of forming a polymeric electrolyte in a solvent comprising at least one component having a boiling point lower than 100° C. and which solvent is capable of solvating an electrolytic salt;

(ii) coating the solvated electrolyte precursor onto an electrode to form a layer of electrolyte precursor;

(iii) covering the electrolyte precursor with a protective sheet layer which is substantially impervious to the solvent but which allows passage of radiation which cures the uncured electrolyte;

(iv) curing the electrolyte precursor by radiation through the sheet layer;

(v) removing the protective sheet layer from the cured electrolyte; and (vi) applying an electrode layer to the cured electrolyte.

Each of these steps is now discussed.

Step (i) involves solvating a monomer or partial polymer capable of forming a polymeric electrolyte in a solvent having a boiling point lower than 100° C., preferably lower than 90° C.

The choice of low boiling solvent is made based on the same criteria employed in the art to date except without the constraint of comprising solely employing higher boiling point solvents. Thus, a suitable solvent component is one which is capable of dissolving both the electrolyte precursor components as well as the ionically conductive salt. The solvent component is also one which is radiation inert. Suitable solvent components include dimethoxy ethane, 2-methyl tetrahydrofuran, methyl formate or 1,3-dioxolane or mixtures thereof.

Although they can be employed alone, these low boiling point solvent components can be employed in combination with traditional high boiling point solvent components in order to provide the solvent according to the present invention. The amount of the low boiling point solvent components employed in such a solvent mixture is dependent upon, e.g., value of the cathodes and anodes used in the electrolytic cell, as well as the end use for the resulting electrolytic cell. It is preferred that about $\frac{1}{3}$ to about $\frac{2}{3}$ by weight, preferably about 40–60% by weight of the solvent mixture comprise low boiling point solvents.

The actual admixing of the components with the solvent to form the electrolyte precursor layer is carried out in accordance with known techniques except for the use of the solvent having a lower boiling point as described above.

Typically, therefore, the total amount of solvent employed is enough to dissolve the precursor components on the one hand but not so much as to adversely affect the mechanical properties of final crosslinked polymeric electrolyte. This typically amounts to the use of between about 45 and 65% of solvent based on the total weight of the solvent/precursor mixture. The admixing of the solvent with the monomer/partial polymer and other components is carried out by using a standard mixer.

Step (ii) of the process involves coating the electrolyte precursor onto an electrode, either the cathode or anode, to form a layer of uncured electrolyte precursor thereon. The electrode is fabricated from among any of the well known materials commonly employed in the art for solid state electrochemical devices, as described previously.

The layer may be applied by any of the techniques well known in the art such as extrusion, blade-coating, silk screening or other well known techniques, to provide a layer having a thickness ranging between about 25 and 120 $\mu$m. The layer should not be thicker than about 120 $\mu$m because greater thicknesses obviously increase the thickness of the final electrochemical device and decrease the energy density of the final device. On the other hand, the layer should have a thickness greater than about 25 $\mu$m to ensure that it is pinhole free.

Step (iii) in the process entails covering the uncured electrolyte precursor with a protective sheet layer which is substantially impervious to the solvent but which allows passage of radiation which cures the uncured polymeric electrolyte. Exemplary materials for the sheet layer include metal foils such as aluminum foil, polyolefins such as polypropylene and polyethylene, and polyesters. The thickness of the sheet layer is preferably between about 5 and 35 $\mu$m.

In step (iv), the uncured solid electrolyte precursor, covered by the protective sheet layer as described above, is then irradiated to effect crosslinking. The radiation employed for the crosslinking is that conventionally used in the art such as electron beam, ultraviolet and actinic radiation. Typically, the amount of energy applied to the layer to effect crosslinking is between 10 and 50 kGy.

In a preferred embodiment, the electrolyte is cured by continuously passing the arrangement through an electron beam apparatus.

After curing is complete, the protective sheet layer is removed from the cured solid electrolyte. The result is a crosslinked polymeric electrolyte interpenetrated in all directions by the radiation inert ionically conducting electrolyte solvent.

The electrolyte is laminated to the other electrode as soon as possible to avoid evaporation of the solvent. There then may be applied other components such as one or more current collector layers in accordance with techniques recognized in the art.

Variations can be made to the electrochemical cells of the present invention. A preferred cell consists of an alkali metal anode and an intercalary cathode having the solid electrolyte therebetween. Such structures can also employ, in addition to current conducting backing layers, insulating layers and/or bipolar electrode connections in a manner known in the art. A particularly useful current conducting backing layer is aluminum foil for the cathode and nickel foil for the lithium anode.

Preferably, the process of the present invention is carried out using methods and apparatus for forming laminates as described, for example, in copending application 08/078,940 (Attorney docket 028574-049), of common assignee which is incorporated herein by reference in its entirety for all purposes. Such device is merely exemplary of the type of devices employed to make electrochemical devices. A person skilled in the art could readily modify the device to accommodate the layering arrangement of the present invention.

When the process of the invention is carried in an apparatus as illustrated in FIG. 1, it will be appreciated that the electrolyte precursor layer is coated onto the electrode and cured continuously and automatically.

The apparatus includes a spool 1 from which the protective sheeting is fed and a spool 2 which collects the sheeting. In between the spools 1 and 2 are rollers 3 and 4 which direct the sheet along a planar path for irradiation with electron beam or ultraviolet energy from the energy source 5 and application of the protective sheet to the layer of electrode coated with the electrolyte precursor. Also provided are spools 6 and 7. Spool 6 releases electrode sheeting and spool 7 collects the cured electrode/electrolyte laminate. In between the spools 6 and 7 are provided rollers 8 and 9 which direct the electrode sheet along a planar path immediately below that taken by the protective sheet. As the electrode sheet passes the roller 8, the solvated electrolyte precursor mixture is applied thereto (illustrated at 12). Finally, the electrode in the form of sheet material is fed from a spool 10 which is directed by a roller 11, provided opposite the roller 9, onto the electrode including cured electrolyte after removal of the protective layer.

The following examples are given by way of illustration and in no way should be construed as limiting the subject matter disclosed and claimed.

EXAMPLE 1

The following components were mixed while stirring in a closed container at 60° C.

| Name | g | wt % |
| --- | --- | --- |
| Propylene Carbonate | 72.55 | 36.07% |
| 2-MeTHF | 72.51 | 36.05% |
| PEGDA (SR344) | 19.80 | 9.84% |
| TMPEOTA (Photomer 4158) | 4.01 | 1.99% |
| LiAsF$_6$ | 23.96 | 11.91% |
| PEO | 5.20 | 2.59% |
| Darocur 1173 | 3.11 | 1.55% |
| Total | 201.14 | 100.00% |

In the above table, propylene carbonate is obtained from Aldrich Chemical, Milwaukee, Wis.; 2-MeTHF is 2-methyltetrahydrofuran, is also obtained from Aldrich Chemical; PEGDA is polyethyleneglycol diacrylate having a molecular weight of about 400 available as SR344 from Sartomer Co., Exton, Pa.; TMPEOTA is an ethoxylated trimethylol propane triacrylate available as Photomer 4158 obtained from Henkel Corporation, Ambler, Pa.; PEO is polyethylene oxide having a molecular weight of about 600,000 obtained from Union Carbide Chemicals and Plastics, Danbury, Conn., and Darocur 1173 is a aromatic carbonyl photoinitiator from Ciba-Giegy.

After admixing the above components to form the electrolyte precursor, the precursor was applied to a cathode and covered with a 25 μm thick sheet of polypropylene (Teryakoski Terfilm E). The layer of electrolyte precursor, covered with the protective sheet, was then irradiated with UV radiation for 30 seconds to cure the precursor into the electrolyte. The protective sheet is then removed and the anode immediately applied.

EXAMPLE 2

The same procedure as employed in Example 1 was followed with the formulation set forth below.

| Name | g | wt % |
|---|---|---|
| Propylene Carbonate | 83.01 | 40.97% |
| DME | 55.34 | 27.31% |
| Harcos Photomer 6140 | 34.37 | 16.96% |
| LiAsF$_6$ | 22.80 | 11.25% |
| PEO | 5.05 | 2.49% |
| Darocur 1173 | 2.03 | 1.00% |
| Total | 202.60 | 100.00% |

In the table, DME is dimethoxyethane obtained from Hoechst AG, Frankfort, Germany, and Harcos Photomer 6140 is a urethane acrylate available from Henkel Corporation, Coating and Chemicals Division, Ambler, Pa.

EXAMPLE 3

The same procedure as employed in Example 1 was followed with the formulation set forth below.

| Name | g | wt % |
|---|---|---|
| Propylene Carbonate | 68.28 | 34.13% |
| 2Me-THF | 68.27 | 34.12% |
| Harcos Photomer 6140 | 33.97 | 16.98% |
| LiAsF$_6$ | 22.42 | 11.21% |
| PEO | 5.10 | 2.55% |
| Darocur 1173 | 2.04 | 1.02% |
| Total | 200.08 | 100.00% |

EXAMPLE 4

The same procedure as employed in Example 1 was followed with the formulation set forth below.

| Name | g act | wt % act |
|---|---|---|
| Ethylene Carbonate | 76.00 | 38.56% |
| 2Me-THF | 49.41 | 24.94% |
| Harcos Photomer 6140 | 33.96 | 17.14% |
| LiAsF$_6$ | 33.76 | 17.04% |
| PEO | 4.99 | 2.52% |
| Darocur 1173 | 1.99 | 0.00% |
| Total | 198.12 | 100.00% |

EXAMPLE 5

The same procedure as employed in Example 1 was followed with the formulation set forth below.

| Name | g act | wt % act |
|---|---|---|
| Ethylene Carbonate | 75.88 | 37.87% |
| DME | 49.79 | 24.85% |
| Harcos Photomer 6140 | 33.96 | 16.95% |
| LiAsF$_6$ | 33.76 | 16.85% |

-continued

| Name | g act | wt % act |
|---|---|---|
| PEO | 4.99 | 2.49% |
| Darocur 1173 | 1.99 | 0.99% |
| Total | 200.37 | 100.00% |

COMPARATIVE EXAMPLE 5

The same procedure as employed in Example 1 was followed with the formulation set forth below using only higher boiling solvents i.e., propylene carbonate and triglyme which was obtained from Aldrich Chemicals.

| Name | g act | wt % act |
|---|---|---|
| Propylene Carbonate | 684.47 | 54.52% |
| Triglyme | 171.05 | 13.63% |
| Harcos Photomer 6140 | 212.46 | 16.92% |
| LiAsF$_6$ | 143.66 | 11.44% |
| PEO | 31.23 | 2.49% |
| Darocur 1173 | 12.48 | 0.99% |
| | 1,255.35 | 100.00% |

Ionic conductivity (S/cm) as a function of temperature (° C.) was calculated for the electrolyte of Example 5 and Comparative Example 5 as follows:

| t, °C. | S/cm (Ex. 5) | S/cm (Comp. Ex. 5) |
|---|---|---|
| −10 | 1.80E-03 | 8.57E-04 |
| 0 | 2.70E-03 | 1.31E-03 |
| 10 | 3.83E-03 | 1.85E-03 |
| 20 | 5.18E-03 | 2.45E-03 |
| 30 | 6.75E-03 | 3.10E-03 |
| 40 | 8.52E-03 | 3.79E-03 |
| 50 | 1.05E-02 | 4.50E-03 |
| 60 | 1.26E-02 | 5.22E-03 |

The above results are also set forth in the graph of FIG. 2. This figure illustrates that the electrolytes according to the present invention can have an improved ionic conductivity.

It will be further appreciated that the process of the present invention permits the use of low boiling point solvents for dissolution of the precursors to the electrolyte without the attendant problem of having such solvent evaporate away before the polymer precursors have been cured.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A process for making a solid electrolyte comprising:
   (i) solvating a solid matrix-forming monomer or a partial polymer thereof in a solvent comprising at least one low boiling point solvent component having a boiling point not greater than 100° C. and which is capable of solvating an electrolytic salt;
   (ii) coating the solvated monomer or partial polymer onto an electrode to form a layer of electrolyte precursor;

(iii) covering said electrolyte precursor with a protective sheet layer which is substantially impervious to said solvent but which allows passage of radiation which cures the uncured electrolyte; and (iv) curing the electrolyte precursor by radiation through the sheet layer.

2. The process according to claim 1 further comprising:

(v) removing the protective sheet layer from the cured electrolyte; and (vi) applying an electrode layer to the cured electrolyte.

3. The process of claim 1 wherein the low boiling point component of said solvent is dimethoxy ethane, 2-methyltetrafuran, methyl formate, or 1,3-dioxolane.

4. The process according to claim 1 wherein the solvent is a mixture which further includes at least one high boiling point component having a boiling point above about 100° C.

5. The process according to claim 4 wherein the at least one high boiling point component is an organic carbonate.

6. The process according to claim 4 wherein the low boiling point solvent component comprises about ⅓ to ⅔ of the solvent mixture.

7. The process according to claim 4 wherein the low boiling point component comprises about 40–60% of the solvent mixture.

8. The process of claim 1 wherein said solid matrix forming monomer or partial polymer is an acrylate or methacrylate.

9. The process of claim 1 wherein said protective sheet layer comprises a polyester, a metal foil, or a polyolefin.

10. The process of claim 9 wherein said protective sheet layer comprises a polyester.

11. The process of claim 9 wherein said metal foil is aluminum.

12. The process of claim 9 wherein said polyolefin is polypropylene or polyethylene.

13. The process of claim 9 wherein said protective sheet layer has a thickness ranging between about 5 and about 35 $\mu m$.

14. The process of claim 1 wherein said electrolyte precursor is cured with electron beam, ultraviolet or actinic radiation.

15. The process according to claim 2 wherein the electrode of (ii) is a cathode and the electrode layer of (vi) is an anode.

16. The process according to claim 2 wherein the electrode of (ii) is an anode and the electrode layer of (vi) is a cathode.

17. The process according to one of claims 15 and 16 wherein the cathode is an oxide of vanadium.

18. The process according to one of claims 15 and 16 where the anode is lithium.

* * * * *